United States Patent [19]

Pugar et al.

[11] Patent Number: 4,914,063
[45] Date of Patent: Apr. 3, 1990

[54] PROCESS FOR PRODUCING ORGANIC PRODUCTS CONTAINING SILICON, HYDROGEN, NITROGEN, AND CARBON BY THE DIRECT REACTION BETWEEN ELEMENTAL SILICON AND ORGANIC AMINES

[75] Inventors: Eloise A. Pugar, Isla Vista; Peter E. D. Morgan, Thousand Oaks, both of Calif.

[73] Assignee: The United States of America as represented by the United States Department of Energy, Washington, D.C.

[21] Appl. No.: 177,270

[22] Filed: Apr. 4, 1988

[51] Int. Cl.[4] ..................... C04B 35/56; C08G 77/04
[52] U.S. Cl. ........................................ 501/92; 501/88; 501/95; 501/97; 528/28; 556/412
[58] Field of Search ............... 501/88, 92, 95, 97; 528/28; 556/412

[56] References Cited

U.S. PATENT DOCUMENTS

| | | |
|---|---|---|
| 3,211,527 | 10/1965 | Forsyth . |
| 3,803,197 | 4/1974 | Anderson et al. . |
| 3,959,446 | 5/1976 | Mazdiyasni et al. . |
| 4,073,845 | 2/1978 | Buljan et al. . |
| 4,113,761 | 9/1978 | Kreuzburg et al. . |
| 4,113,830 | 9/1978 | Mazdiyasni et al. . |
| 4,122,152 | 10/1978 | Mori et al. . |
| 4,122,155 | 10/1978 | Prochazka et al. . |
| 4,122,220 | 10/1978 | Sussmuth . |
| 4,145,224 | 3/1979 | Mechalchick et al. . |
| 4,196,178 | 4/1980 | Iwai et al. . |
| 4,208,215 | 6/1980 | Kleiner et al. . |
| 4,235,857 | 11/1980 | Mangels . |
| 4,288,604 | 9/1981 | Magee et al. . |
| 4,314,956 | 2/1982 | Baney et al. . |
| 4,346,068 | 8/1982 | Kasai et al. . |
| 4,368,180 | 1/1983 | Inoue et al. . |
| 4,376,652 | 3/1983 | Buljan . |
| 4,387,079 | 6/1983 | Kasai et al. . |
| 4,395,460 | 7/1983 | Gaul . |
| 4,399,115 | 8/1983 | Sato et al. . |
| 4,404,153 | 9/1983 | Gaul, Jr. . |
| 4,428,916 | 1/1984 | Komeya et al. . |
| 4,482,669 | 11/1984 | Seyferth et al. . |
| 4,552,740 | 11/1985 | Morgan et al. . |
| 4,590,053 | 5/1986 | Hashimoto et al. . |
| 4,612,297 | 9/1986 | Kasai et al. . |
| 4,639,501 | 1/1987 | Seyferth et al. . |
| 4,650,837 | 3/1987 | Seyferth et al. . |
| 4,722,988 | 2/1988 | Porte et al. . |
| 4,767,876 | 8/1988 | Seyferth et al. . |
| 4,820,783 | 4/1989 | Seyferth et al. . |
| 4,835,238 | 5/1989 | Burns . |

OTHER PUBLICATIONS

J. W. Mellor, *A Comprehensive Treatise on Inorganic and Theoretical Chemistry*, vol. VI, (Wiley, New York, 1961), p. 163.
Rahaman et al., "Surface Characterization of Silicon Nitride and Silicon Carbide Powders", Am. Ceram. Soc. Bull., vol. 65(8), 1945, pp. 1171-1176.
Rochow, "The Direct Synthesis of Organosilicon Compounds", J. Am. Chem. Soc., Jun. 1945, pp. 963-965.
Zuckerman, "Direct Synthesis of Organosilicon Compounds", *Advances in Inorganic Chemistry and Radio Chemistry*, vol. 6, 1964.

(List continued on next page.)

Primary Examiner—Mark L. Bell
Assistant Examiner—Karl Group
Attorney, Agent, or Firm—L. E. Carnahan; Roger S. Gaither; William R. Moser

[57] ABSTRACT

A process is disclosed for producing, at a low temperature, a high purity organic reaction product consisting essentially of silicon, hydrogen, nitrogen, and carbon. The process comprises reacting together a particulate elemental high purity silicon with a high purity reactive amine reactant in a liquid state at a temperature of from about 0° C. up to about 300° C. A high purity silicon carbide/silicon nitride ceramic product can be formed from this intermediate product, if desired, by heating the intermediate product at a temperature of from about 1200°-1700° C. for a period from about 15 minutes up to about 2 hours or the organic reaction product may be employed in other chemical uses.

30 Claims, 1 Drawing Sheet

---

FORMING A MIXTURE OF A HIGH PURITY REACTIVE AMINE IN A LIQUID STATE AND HIGH PURITY PARTICULATE ELEMENTAL SILICON

REACTING THE MIXTURE AT FROM ABOUT 0° C TO ABOUT 300° C TO FORM A PRODUCT CONSISTING ESSENTIALLY OF NITROGEN, SILICON, HYDRGEN, AND CARBON.

OTHER PUBLICATIONS

D. Campos-Loriz et al., "The Effects of Hydrogen on the Nitridation of Silicon", J. Mat. Sci., vol. 14, 1979, pp. 1007–1008.

Dervisbegovic et al., "The Role of Hydrogen in the Nitridation of Silicon Powder Compacts", J. Mat. Sci., vol. 16, 1979, pp. 1945–1955.

Lin, "Comparative Studies of Metal Additives on the Nitridation of Silicon", J. Am. Cerm. Soc., vol. 60(1-2), 1977, pp. 78–81.

Lin, "Mass Spectrometric Studies on High Temperature Reaction Between Hydrogen Chloride and Silica/Silicon", J. Electrochem. Soc., vol. 123, 1976, pp. 512–514.

FORMING A MIXTURE OF A HIGH
PURITY REACTIVE AMINE IN A
LIQUID STATE AND HIGH PURITY
PARTICULATE ELEMENTAL SILICON

REACTING THE MIXTURE AT FROM
ABOUT 0° C TO ABOUT 300° C
TO FORM A PRODUCT CONSISTING
ESSENTIALLY OF NITROGEN,
SILICON, HYDRGEN, AND CARBON.

PROCESS FOR PRODUCING ORGANIC PRODUCTS CONTAINING SILICON, HYDROGEN, NITROGEN, AND CARBON BY THE DIRECT REACTION BETWEEN ELEMENTAL SILICON AND ORGANIC AMINES

BACKGROUND OF THE INVENTION

The invention described herein arose in the course of, or under, Contract No. DE-FG03-85ER45221 between the U.S. Department of Energy and Rockwell International Corporation.

This invention relates to a process for the production of silicon, nitrogen organic compounds consisting essentially of silicon, hydrogen, nitrogen, and carbon which may be employed as intermediates or end products in a wide variety of chemical synthetic preparations including the formation of ceramic silicon carbide and silicon nitride materials, including films, fibers, or coatings. More particularly, this invention relates to the reaction of elemental silicon with organic amines at a low temperature to produce a high purity material consisting essentially of silicon, hydrogen, nitrogen, and carbon and further characterized by the substantial absence of halides or of silicon bonded to oxygen.

The formation of organosilicon compounds by reaction between elemental silicon and an alkyl or aryl halide was first described by Eugene G. Rochow in a paper entitled "The Direct Synthesis of Organosilicon Compounds", published in Volume 67 of the Journal of the American Chemical Society in June, 1945, at pp. 963–965. The Rochow process or reaction of methylene chloride with silicon is also described by J. J. Zuckerman on pp. 384–393 in a chapter entitled "Direct Synthesis of Organosilicon Compounds", in a book edited by H. J. Emeleus and A. G. Sharp entitled "Advances in Inorganic Chemistry and Radiochemistry" published by Academic Press, Volume 6, N.Y., 1964.

Silicon carbide is an important material having a diamond-like structure and a hardness nearly that of diamond. It is widely used as an abrasive for grinding and cutting metals.

Silicon carbide may be formed by the high temperature reaction between silica and a carbon source, e.g., coke, rice hulls, etc., at a temperatures of from 2000° C. up to as high as 3000° C. The resulting silicon carbide product may, however, have silica or carbon preset therein as impurities.

It is also known to form silicon carbide at lower temperatures from reactants which include organic materials. Gaul U.S. Pat. No. 4,404,153 teaches the formation of a silazane polymer by reacting together, at a temperature of 125 to 300° C., a chlorine-containing disilane having the formula $(Cl_aR_bSi)_2$ with a disilazane having the general formula $(R'_3Si)NH$ wherein R is vinyl, an alkyl group of 1–3 carbons, or the phenyl group; R' is vinyl, hydrogen, an alkyl group of 1–3 carbons, or the phenyl group; a has a value of 0.5–3; b has a value of 0–2.5; and the sum of a+b is equal to 3. The resulting silazane polymer can be converted to silicon carbide by heating it in an inert atmosphere or vacuum to 750° C.

Baney et al U.S. Pat. No. 4,314,956 discloses aminated methyl polysilanes which are useful in the preparation of silicon carbide ceramics. The polysilane is said to have the average formula: $((CH_3)_2Si)$—$(CH_3Si)$ wherein there is also bonded to the silicon atoms other silicon atoms and radicals having the formula —NHR wherein R is hydrogen, an alkyl radical of 1 to 4 carbon atoms, or phenyl wherein essentially all of the remaining bonds on silicon are attached to chlorine or bromine atoms. As understood, the polysilane is formed by reacting a polyhalosilane starting material with ammonia or substituted or unsubstituted organic amines having the general formula $NHR_2$.

Seyferth et al U.S. Pat. No. 4,650,837 describes a method for forming preceramic polymers useful for making silicon carbide and silicon nitride/silicon carbide ceramics. The preceramic polymer is formed by reacting together a polycarbosilane with a metal silylamide. The polycarbosilane reactant has repeating units with the formula $[RSi(H)—(CH_2)_q]$ wherein R is H, a 1–6 carbon alkyl group, a 3–6 carbon cycloalkyl group, or a 6–10 carbon substituted or unsubstituted lower aryl group; and q is an integer of 1 or greater. The metal silylamide reactant has the formula $[(R^1SiHNH)_a(R^1SiN)_b(R^1SiHNM)_3]_m$ wherein $a+b+c=1$; $R^1$ is a 1–6 carbon alkyl group, a 2–6 carbon substituted or unsubstituted alkenyl group, a 6–10 carbon substituted or unsubstituted aryl group, a tri(lower)alkyl- or di(lower)alkylsilyl group, or a di(lower)alkylamino group; M is an alkali metal or one half equivalent of an alkaline earth metal; and m is an integer greater than 1. The polymer is said to be converted to a ceramic by heating it to 1000° C. at 10° C./min. Chlorine retention problems (in the form of MCl salt residues) are, however, inherent in this process for making preceramic polymers thereby causing this process to be uneconomical.

While the processes described in these patents do produce silicon carbide or silicon nitride from organic derivatives at lower temperatures than the aforesaid reaction at 2200–3000° C. between silica and a carbon source, the processes which use organic sources of carbon are usually contaminated with traces of halides from the reactants used to form the organic precursors.

The original investigation of low and high temperature direct reactions between elemental silicon and nitrogen compounds was conducted by E. Vigouroux, as quoted by J. W. Mellor in *A Comprehensive Treatise on Inorganic and Theoretical Chemistry*, Vol. VI, N.Y.: Wiley, 1961, p. 163. He discovered that ammonia reacts with silicon at bright red heat, forming the nitride with liberation of hydrogen. High temperature nitridation of silicon is also detailed by Mangels U.S. Pat. No. 4,235,857 and is otherwise well known. However, ultra-high-purity silicon is difficult to nitride at high temperature due to formation of protective nitride layers (exactly of the type used on semiconductors for passivation). According to S. S. Lin in an article entitled "Mass Spectrometric Studies on High Temperature Reaction Between Hydrogen Chloride and Silica/Silicon" in the Journal Electrochem. Society, Vol. 123, 1976, pp. 512–514 and another article entitled "Comparative Studies of Metal Additives on the Nitridation of Silicon" in the Journal Am. Ceram. Soc., Vol. 60 (1–2), 1977, pp. 78–81; halide, iron, or other cation catalysts are required in such nitriding processes. D. Campos-Loriz et al, in an article entitled "The Effects of Hydrogen on the Nitridation of Silicon" in the Journal Mat. Sci., Vol. 14, 1979, pp. 1007–1008, and H. Dervisbegovic et al in an article entitled "The Role of Hydrogen in the Nitridation of Silicon Powder Compacts" in the Journal Mat. Sci, Vol. 16, 1979, pp. 1945–55, further explored the catalytic effects of hydrogen and water vapor on nitridation of silicon with a view to overcome the sluggishness and high expense of the process.

It would be desirable to have a process wherein elemental silicon, which is available as a high purity starting material, could be reacted at a temperature, equivalent at atmospheric pressure to from about 0° C. up to about 300° C. with an organic amine reactant in its liquid state to form a high purity organic product consisting essentially of silicon, hydrogen, nitrogen, and carbon, without requiring a halide or other anion to be bonded to silicon prior to reaction with a given amine.

SUMMARY OF THE INVENTION

It is, therefore, an object of this invention to provide a process for forming a high purity product consisting essentially of silicon, hydrogen, nitrogen, and carbon by reaction of elemental silicon and a reactive amine at a low temperature.

It is another object of this invention to provide a process for forming a high purity product consisting essentially of silicon, hydrogen, nitrogen, and carbon from an initial reaction of elemental silicon and a reactive amine at a temperature of from about 0° C. up to about 300° C.

It is a further object of the invention to provide a process for forming silicon carbide or silicon nitride ceramic type materials, or mixtures or compounds of same, characterized by the substantial absence of halide or silicon oxide, from an intermediate reaction product consisting essentially of silicon, hydrogen, nitrogen, and carbon which, in turn, is produced at a temperature of from about 0° C. up to about 300° C. from a reaction between high purity elemental particulate silicon and a high purity amine reactant in a liquid state.

These and other objects of the invention will be apparent from the following description and accompanying flow sheet.

BRIEF DESCRIPTION OF THE DRAWINGS

The sole FIGURE is a flow sheet illustrating the process of the invention.

DETAILED DESCRIPTION OF THE INVENTION

A high purity product, consisting essentially of silicon, hydrogen, nitrogen, and carbon, is produced, in accordance with the invention, by reacting high purity elemental particulate silicon with a high purity reactive amine reactant in a liquid state at a temperature, equivalent at atmospheric pressure, of from about 0° C. up to about 300° C. The organic product produced from this direct reaction between elemental silicon and the respective amines may be, in turn, further employed in the synthesis of substances having these elements bonded together to form high temperature refractories, mainly silicon carbide, with silicon nitride as a secondary product.

The discovery that organic amines react with elemental silicon, albeit more sluggishly, perhaps, than the organic halides described in the Rochow direct process, or the organic alcohols, opens up a vast organic chemistry of possible compounds, as final products or intermediates for further processing. All of the usual chemical methods of purification such as distillation, recrystallization, solvent extraction, adsorption, chromatography may be used, as is well known to those skilled in the art, to purify and isolate the organic, nitrogen, silicon compounds as desired for end products or as intermediates. Although the products produced by these reactions have been used to form ceramic products such as large pieces, films, and fibers, the products formed may be useful in the formation of drugs, insecticides, polymers, and as chemical intermediates for hormones and other active chemicals. Ceramics are, however, important possible end products of these nitrogen-silicon-carbon-hydrogen compounds and can be produced from these products to, for example, silicon carbide and/or silicon nitride by methods such as pyrolysis and pressing in inert or reactive environments.

The high purity reactive amine reactant may comprise any organic-nitrogen compound including primary, secondary, and tertiary aliphatic, aromatic, or mixed aliphatic-aromatic amines, e.g., mono, di, and tri alkyl amines; mono, di, and tri aryl amines; mono, di, and tri aralkyl amines; and mixtures thereof. Such reactive amines could be broadly characterized by the formula $R^1R^2R^3(N)$, wherein $R^1$ is a 1–18 carbon alkyl group, an aryl group, an aralkyl group, or an alkaryl group; $R^2$ is hydrogen, a 1–18 carbon alkyl group, an aryl group, an aralkyl group, or an alkaryl group; and $R^3$ is hydrogen, a 1–18 carbon alkyl group, an aryl group, an aralkyl group, or an alkaryl group. Examples of such amines include amine compounds as diverse as octadecylamine, dimethylamine, and aniline.

The organic-nitrogen compound may also include more than one amine group separated by an organic group, e.g. a diamine, triamine, tetramine, etc., such as, for example, ethylenediamine, 1,2-diaminopropane, 1,3-diaminopropane, 1,6-diaminohexane 1,12-diaminododecane, and hexamethylenetetramine. The organic-nitrogen compound may also include compounds having a direct N—N bond, e.g., arylhydrazines such as, for example, phenylhydrazine. Also included in the term "amine", as used herein, are cyclic organic-nitrogen compounds containing one or more nitrogens in the ring structure itself such as, for example, pyridine, pyrrole, imidazole, and triazole type compounds.

Substituents on the R groups are countenanced so that the product species have desired properties as intermediates or products in further steps (e.g., polymers, drugs, insecticides, etc.).

The purity of the high purity amine reactant should be nominally at least 99.5 wt.%, preferably 99.995 wt.%, to obtain the desired high purity intermediate. This purity can usually be obtained by distillation of the amine.

The other reactant comprises a elemental high purity silicon in particulate form. By high purity silicon is meant a purity of 99.5 wt.% or better, preferably 99.999 wt.% pure. In some instances, it may be desirable to alloy the elemental silicon with another metal such as copper to form a copper-silicon alloy which will be reacted with the amine.

The particle size range of the elemental silicon reactant is preferably about 100 mesh (Tyler) or smaller, i.e., below about 150 microns. Although larger particle sizes of silicon can be used to react with the amine reactant, it will be appreciated that for a thorough and efficient reaction, it is important that the surface area of silicon in contact with the reactive amine be large. Larger silicon particles, even lumps (i.e., 2.5 cm. diameter) with reduced surface area will react more slowly. Use of such large particles could be desirable in a continuous flow of reactants in an industrial process application of this invention. The lower limit of the silicon particle size will be governed by the availability of smaller particles as well as possible safety limitations from the standpoint of the extent of the pyrophoric properties of the fine particles. A range of particle size of from about 0.01 microns (colloidal) up to about 100 mesh (Tyler), preferably from about 0.01 to 150 microns, will provide particles which will react quickly and thoroughly with the amine reactant without incurring undue safety risks.

If larger particle sizes of silicon are used, e.g., larger than 100 mesh (Tyler), such particles may be ground prior to the reaction, or in situ during the reaction as will be discussed below, under conditions which will not compromise the desired purity. For example, larger silicon particles may be ground using large lumps of silicon as a milling agent.

Since it is recognized that silicon is technically a metalloid (semiconductor) and not a metal, the term "elemental" is used herein with respect to the silicon reactant to define that the element silicon, i.e., reduced silicon and not a silicon compound, is what is being referred to as the high purity reactant.

In accordance with the invention, the amine reactant and the particulate elemental silicon reactant may be reacted together at a low temperature, comprising a temperature usually above the melting point of the particular amine reactant at the pressure employed, and usually below, but sometimes at, the equivalent boiling point of the amine at the pressure employed by rolling or milling the reactants together in a nonreactive vessel and using a milling agent which will not contaminate the reactants, such as, for example, large lumps of purified silicon.

The amine may be reacted with the elemental silicon at temperatures ranging from ambient temperature, i.e., from about 0° C., up to about 300° C. If the particular amine does not have a liquid phase at the pressure used, such as, for example, hexamethylenetetramine at atmospheric pressure, the amine may be first dissolved in a suitable solvent such as, for example, acetonitrile or toluene and the solution then reacted with the elemental silicon by milling as previously described. In such a case, the solvent must be of equivalent purity to preserve the desired purity of the product and the solvent should preferably not include elements other than hydrogen, nitrogen, and carbon and should not itself react with silicon.

In some instances it may be desirable or necessary to raise the temperature to above ambient temperature to melt the amine as it reacts with the elemental silicon. In some other instances, it may be necessary to reflux the amine in the presence of the ground elemental silicon.

The term "low temperature", as used herein, is therefore intended to define a temperature, equivalent at atmospheric pressure, of from about 0° C. up to about 300° C. to distinguish this process from prior art processes wherein temperatures of over 1000° C., and sometimes over 2000° C. are used in the initial reaction between the silicon-containing reactant and other reactants.

It should be noted that the above discussion with regard to reaction temperature ranges has been phrased in language indicating temperatures equivalent to the recited temperatures at atmospheric pressure because it is recognized that the reaction may very well be carried out at other than atmospheric pressure, i.e., at pressures as high as 10–20 atmospheres. Thus it will be recognized that the reaction temperature ranges discussed are not absolutes, but are relative to the pressure employed.

The reaction time of the reactants (or residence time for a continuous reaction) will vary depending upon the reactants, the temperature/pressure at which the reaction is carried out, and other reaction conditions as will be discussed below. The reaction begins upon contact between the amine and a clean silicon surface. Total reaction time, for a batch reaction containing specified quantities of reactants (e.g., 50 ml. dimethylamine and 5 gms of silicon of 1 micron particle size) may extend from about 1 hour to as many as 100 hours to permit sufficient accumulation of product. Longer reaction time periods, are possible, given greater particle sizes of silicon and surface buildup of the $SiO_2$ layer.

The reaction time may be accelerated, in accordance with a preferred embodiment of the invention, by conducting a grinding or milling action during the reaction. This is thought to accelerate the reaction by constantly exposing fresh unreacted silicon surfaces and contacting them with the amine reactant.

Such milling or grinding of the elemental silicon serves to remove any coatings on the surface of the elemental silicon (i.e., $SiO_2$) which, but for such removal, might interfere with the reaction between the silicon and the amine reactant. Such coatings may also be optionally removed prior to the reaction by chemical treatment of the particulate silicon with stripping reagents such as hydrofluoric acid or ammonium bifluoride to promote the reaction time considerably, e.g., to less than 0.5 hours. In such cases the HF or ammonium fluoride is removed by vacuum prior to the reaction to preserve the desired purity. Heating of silicon to at least 1300° C. in a reducing atmosphere such as an argon/hydrogen atmosphere may also be used to remove the surface layers on the silicon as SiO gas.

It is also possible to accelerate the reaction time by catalyzing the reaction through the presence of a catalyst such as, for example, copper with the silicon in the reaction with the particular amine. If such an alloy is used, the copper may be removed chemically by forming compounds which decompose at low temperatures, e.g., CuCN at 500° C. While these procedures may act to accelerate the reaction between the amine and the silicon, their use will depend upon the desired purity of the resultant product and the ability to purify the intermediates.

It should be noted that when such grinding or milling is carried out as a part of the reaction, the use of larger size elemental silicon particles, i.e., particles larger than 100 mesh (Tyler), i.e., as large as one-half inch in diameter, can be used which will be ground down in situ during the progress of the reaction. It should be further noted that the reaction may be carried out on a continuous basis with product removed as it is produced, or on a periodic basis, and the use of large size elemental silicon particles which are ground in situ during the course of the reaction may be of particular value when the process is run on a continuous basis and liquid, containing the intermediate product formed by the reaction, is continuously removed from the reaction zone, leaving the large particles of elemental silicon to be further ground and reacted with fresh amine reactant, continuously fed into the reaction zone.

It should be understood that grinding or milling is a simple laboratory test to show that the removal of surface oxide is necessary for the reaction to quickly proceed. This, and other experimental tests, easy to conduct at the bench scale, are not intended to limit the claimed process. Obviously many methods exist to activate and remove superficial layers including "catalytic" treatments with fluorides, etc. The contamination introduced by possible catalysts must be separately addressed and obviously the choice of such reagents will depend upon the subsequent chemistry.

When the reaction is carried out on a batch basis, the amine reactant may be used in stoichiometric excess which then permits recovery of the reaction product by evaporation of the remaining liquid amine reactant. When a continuous process is used, a solution may be continuously removed from the reaction zone containing both the intermediate product and the liquid amine reactant which may then be separated from the intermediate product by evaporation of the amine which may then be recycled back to the reaction zone if desired.

The product of this reaction usually comprises a solid precipitate, but may comprise a mixture of solids and liquid, consisting of silicon, hydrogen, nitrogen, and carbon with less than about 50 ppm impurities. This product may be employed in applications which require one or more elements in liquid form, e.g., such as for polymer processing to fibers.

Whether the product formed will be a solid or may also be present in solution as well will depend upon the particular amine reactant and the degree of reaction. In cases where the amine is a liquid at 25° C., the product shows up in a solid residue, but silicon, in a form which does not appear to be unreacted, is also detected in the solution. For solid amines at 25° C., only solids form at 25° C. (or molten resins above $T_m$). For example, diaminoethane, 1,2-diaminopropane, 1,3-diaminopropane, pyridine, aniline, and phenylhydrazine all react with silicon to form liquids; 1,6-diaminohexane and 1,12-diaminododecane react with silicon to form solids; and hexamethylenetetramine reacts with silicon to form a solid which dissolves in solution, e.g., dissolves in acetonitrile.

The product formed in accordance with the invention could also be used as a reagent in a wide range of chemistry to synthesize complex molecules containing silicon, hydrogen, nitrogen, and carbon and possibly other elements. In turn, this could be used as an intermediate to produce silicon ceramics (e.g., a silicon carbide/silicon carbide ceramic) by appropriate reaction paths. For example, the intermediate could be heated to a temperature of from about 800 to about 1300° C., depending upon the particular intermediate product, in an inert atmosphere, e.g., argon, to form an amorphous ceramic product with ammonia and hydrogen gas. This amorphous product may then be further heated to a temperature of from about 1000–1700° C. in an inert atmosphere, e.g., argon, to produce a crystalline silicon carbide/silicon nitride ceramic.

Such heating has been carried out to form such silicon carbide/silicon nitride mixtures. It should be noted, however, that this has been done, often at least in part, as a convenient bench test to verify the presence of Si—C and Si—N bonds in the intermediate product, rather than solely as an example of the utility of the intermediate product.

The following examples will serve to better illustrate the process of the invention.

EXAMPLE I

In a reaction vessel, 5 grams of particulate silicon, having a particle size of 1 micron or less and a purity of 99.9 wt.%, and 50 ml of distilled ethylenediamine were stirred continuously under an inert argon atmosphere for 24 hours at a temperature of 25° C., using silicon chunks to produce some grinding action. This reaction between the silicon and the ethylenediamine produced fine particle size agglomerates of less than 1 micron which tended to float to the surface in a foam. The solid product residue (which decomposes upon exposure to air) was separated from the solution by filtration under an inert dry argon atmosphere.

The infrared spectrum of the precipitate exhibits the regular $NH_2$ anti-symmetrical stretching deformation and wagging modes from ethylenediamine. New bands in the region 550–1200 $cm^{-1}$ including a broad Si—N stretch at about 970 $cm^{-1}$ are also apparent. Comparison of the total flask product residue (product and unreacted silicon) infrared data to a silicon reference pattern, the appearance in the precipitate of a strong Si—N absorption at about 970 $cm^{-1}$, weak N—H wagging modes at about 1210–1610 $cm^{-1}$, and a weak Si—C stretch at about 790 $cm^{-1}$, all support occurrence of a reaction. Also the spectrum contained a broadened NH anti-symmetrical stretch between 2800–3300 $cm^{-1}$. UV spectral data of the product showed absorption at 210 nm and 288 nm.

The solid residue produced two small low angle XRD peaks at 6.32 Angstroms and 4.06 Angstroms at low temperature (200° C.), indicating that the product is, perhaps, surprisingly crystalline. Both of these peaks disappear at high temperature (>1400° C.) to produce silicon carbide with a small amount of silicon nitride. Light green, mostly silicon carbide whiskers result here.

Inductively coupled plasma atomic absorption analysis of the solution indicate that some silicon is retained in the liquid phase (254ppm). Evaporation of the solution left a silicon containing residue detected by energy dispersion spectroscopy (EDS), indicating that a Si,N,C,H complex is forming.

The NMR spectra shows two distinct signals downfield from the signal for proton bound to nitrogen (N—H) at 2.6 ppm; a triplet centered at 2.43 ppm and a singlet at 2.276 ppm. In the $^{13}C$ spectrum, next nearest neighbor effects are observed by a 0.143 ppm downfield shift. These results indicate that reaction of the silicon with the amine begins in solution with bonding mainly to nitrogen and hydrogen with a small amount to carbon. Similar effects were slowly achieved by rolling ethylene diamine with silicon lumps.

EXAMPLE II 1,2-diaminopropane was reacted with silicon similarly to the procedure of Example I for ethylenediamine. From analysis of the solution product, it appears that 1,2-diaminopropane reacts directly with silicon. The solution becomes yellow-green or lime green in color upon reaction. In the infrared spectrum, new bands appear in the 1150–1200 $cm^{-1}$ and 1230–1275 $cm^{-1}$ regions and a heightened shoulder around 2800 $cm^{-1}$. ICP plasma atomic absorption analysis of the solution indicated presence of retained silicon (700 ppm). UV analysis of the solution showed three weak absorptions at 240 nm, 297 nm, and 322 nm. The solid residue major portion of the reaction was analyzed by XRD which showed it to be amorphous. It produced SiC whisker product after heat treatment at 1400° C. in Argon.

Similar results were obtained by reacting 1,3-diaminopropane with particulate silicon by milling the reactants together.

EXAMPLE III

Due to its light sensitivity, 50 ml of phenylhydrazine were reacted with 5 grams of silicon of similar purity and particle size to that of Example I in the dark at room temperature under an inert argon atmosphere by stirring the silicon particulate with lumps of silicon of similar purity. The reaction produced a dark brown solution. The residue from evaporation of this solution product, when heated to 1300° C., yielded a mixture of silicon carbide and silicon nitride product indicating the presence of silicon, hydrogen, nitrogen, and carbon in the reaction product.

EXAMPLE IV 5 grams of hexamethylenetetramine solid having a purity of 99-98% were dissolved in 100 ml. of acetonitrile having a purity of 100.0% (High Performance Liquid Chromatography Grade). The solution was then mixed with 2 grams of particulate silicon having an average particle size of 1 micron and the silicon particulate was stirred for about 72 hours at a temperature of about 90° C. (to reflux the acetonitrile) using silicon lumps of the same purity as the powder. The reaction produced a light grey powder which yielded silicon carbide fibers upon heating to 1300° C. in Argon. A weak Si—C IR band at 790 cm$^{-1}$ and a Si—N band at 970 cm$^{-1}$ were noted for the intermediate product.

EXAMPLE V

Particulate silicon having a similar particle size and purity to that of the silicon of Example I was reacted with 1,6-diaminohexane by first heating the mixture to just over 42° C. to melt the amine and then stirring the silicon for 48 hours using silicon lumps of similar purity to form a viscous brown slurry which solidified at 25° C. The infrared spectrum of the solid reaction product showed Si—N stretch at 970 cm$^{-1}$, N—H wags at 1200-1600 cm$^{-1}$, and NH$_2$ antisymmetrical stretch at 2800-3300 cm$^{-1}$ Heating the slurry to 1300° C. in argon resulted in the formation of a fibrous silicon carbide product.

Similar results were obtained by reacting particulate silicon with 1,12-diaminododecane at 73° C. (the melting point of 1,12-diaminododecane) for 100 hours.

EXAMPLE VI 50 ml. of aniline and 5 grams of particulate silicon of similar purity and particle size to the silicon in Example I were refluxed for 72 hours at the boiling point of aniline (184° C.) in the dark. The resultant solid reaction product was filtered and analyzed. The infrared spectrum of the solid reaction product showed 970 cm$^{-1}$ Sn—H symmetrical stretch 1200-1600 (NH$_2$ wags), and broadened stretch between 2800-3300 cm$^{-1}$ (NH$_2$ antisymmetrical stretch). As in the previous examples, heating the solid reaction product to 1300° C. in argon resulted in the formation of a mainly silicon carbide product.

While specific embodiments of the process for forming a high purity organic product containing silicon, hydrogen, nitrogen, and carbon have been illustrated and described in accordance with this invention, by way of illustration and not of limitation, modifications and changes of the process, including parameters and materials, etc. will become apparent to those skilled in the art, and it is intended to cover in the appended claims all such modifications and changes which come within the scope of the invention.

What is claimed is:

1. A process for forming a high purity product consisting essentially of silicon, hydrogen, nitrogen, and carbon which comprises reacting elemental silicon with an amine reactant at a low temperature.

2. The process of claim 1 wherein said low temperature comprises a temperature, equivalent at atmospheric temperature, of from about 0° C. to about 300° C.

3. The process of claim 2 wherein said amine reactant reacted with said elemental silicon is in a liquid state at the reaction temperature.

4. The process of claim 3 wherein said amine reactant consists of an amine dissolved in a liquid solvent to form a liquid solution at the reaction temperature.

5. The process of claim 3 wherein said amine reactant is heated to a molten state during said reaction.

6. The process of claim 2 wherein said amine reactant is reacted with said elemental silicon by refluxing the mixture at the boiling point of the amine reactant at the pressure employed in the reaction.

7. The process of claim 2 wherein the pressure of the reaction varies from atmospheric pressure up to about 20 atmospheres.

8. The process of claim 7 wherein the pressure of the reaction varies from atmospheric pressure up to about 10 atmospheres.

9. The process of claim 7 wherein said elemental silicon is reacted with said amine reactant for a period of from about less than 1 hour up to about 100 hours.

10. The process of claim 9 wherein said reaction time is from about 1 hour up to about 50 hours.

11. The process of claim 7 wherein said process is run on a continuous basis and said reactants have a contact time together of from less than 1 hour up to about 100 hours.

12. The process of claim 7 wherein said amine reactant is present in stoichiometric excess with respect to said elemental silicon reactant.

13. The process of claim 7 wherein said elemental silicon has a purity of 99.5 wt.% or greater.

14. The process of claim 7 wherein said elemental silicon used in said reaction has a particle size range of from about 0.01 microns to about 100 mesh (Tyler).

15. The process of claim 14 wherein said particulate elemental silicon used in said reaction has a particle size range of from about 0.01 microns to about 150 microns.

16. The process of claim 7 including the step of removing surface coatings on said particulate elemental silicon to promote reaction between said silicon and said amine reactant.

17. The process of claim 7 including the step of removing surface coatings on said particulate elemental silicon during the reaction of said particulate silicon with said amine reactant to promote reaction between said silicon and said amine reactant.

18. The process of claim 17 wherein said step of removing surface coatings on said particulate elemental silicon during the reaction of said particulate silicon with said amine reactant further comprises milling said silicon reactant to promote reaction between said silicon and said amine reactant.

19. The process of claim 7 wherein said amine reactant is selected from the class consisting of:
(a) amines having the formula $R^1R^2R^3(N)$ wherein $R^1$ is a 1-18 carbon alkyl group, an aryl group, an aralkyl group, or an alkaryl group; $R^2$ is hydrogen, a 1-18 carbon alkyl group, an aryl group, an aralkyl group, or an alkaryl group; and $R^3$ is hydrogen, a 1-18 carbon alkyl group, an aryl group, an aralkyl group, or an alkaryl group;
(b) a diamine, triamine, or tetramine; and (c) organic nitrogen compounds having a direct N—N bond, including cyclic organic nitrogen compounds.

20. The process of claim 7 wherein said amine reactant is selected from the class consisting of amines having the formula $R^1R^2R^3(N)$, wherein $R^1$ is a 1-18 carbon alkyl group, an aryl group, an aralkyl group, or an alkaryl group; $R^2$ is hydrogen, a 1-18 carbon alkyl group, an aryl group, an aralkyl group, or an alkaryl group; and $R^3$ is hydrogen, a 1-18 carbon alkyl group, an aryl group, an aralkyl group, or an alkaryl group.

21. A process for producing, a high purity reaction product consisting essentially of silicon, hydrogen, nitrogen, and carbon which comprises: reacting together, at a pressure of from about atmospheric pressure up to about 20 atmospheres, and a temperature, equivalent at atmospheric temperature, of from about 0° C. to about 300° C., elemental silicon having a particle size range of from about 0.01 to 100 mesh (Tyler) and a purity of at least about 99.5 wt.% with a reactive amine reactant in liquid form for a period of from about less than 1 hour up to about 100 hours, 22. The process of claim 21 including the s removing surface coatings on said particulate elemental silicon to promote reaction between said silicon and said amine reactant.

23. The process of claim 22 including the further step of milling said elemental silicon during the reaction of said silicon with said amine reactant to reduce the particle size, to accelerate the reaction time by exposing fresh surfaces of said silicon particulate for reaction with said amine reactant, and to remove surface coating on said particulate elemental silicon.

24. The process of claim 22 wherein said coating on said elemental silicon particulate is removed by chemical treatment of said silicon with a reagent capable of removing said coating.

25. The process of claim 22 wherein said coating on said elemental silicon particulate is removed by heating said particulate to a temperature of at least 1300.C in a reducing atmosphere.

26. The process of claim 21 wherein said elemental silicon has a purity of at least 99.999 wt.%.

27. The process of claim 21 including the further step of heating said reaction product to a temperature of from about 1000-1700° C. in a nonreactive atmosphere to convert said reaction product to a crystalline material consisting essentially of silicon carbide and silicon nitride.

28. The process of claim 21 including the further step of heating to a temperature of from about 800 to about 1300° C. so as to produce an amorphous intermediate, capable of subsequent conversion to a crystalline product.

29. A process for continuously producing, from particulate metallic silicon and a reactive amine liquid, an intermediate product consisting essentially of silicon, hydrogen, nitrogen, and carbon which is capable, upon subsequent heating to a temperature of at least 800° C., of being converted into a high purity silicon carbide/silicon nitride ceramic which process comprises:

(a) continuously reacting elemental silicon particles having a purity of at least 99.5 wt.%, at a temperature, equivalent at atmospheric pressure of from about 0° C. up to about 300° C. with a reactive amine selected from the class consisting of:
 (1) amines having the formula $R^1R^2R^3(N)$ wherein $R^1$ is a 1-18 carbon alkyl group, an aryl group, an aralkyl group, or an alkaryl group; $R^2$ is hydrogen, a 1-18 carbon alkyl group, an aryl group, an aralkyl group, or an alkaryl group; and $R^3$ is hydrogen, a 1-18 carbon alkyl group, an aryl group, an aralkyl group, or an alkaryl group;
 (2) a diamine, triamine, or tetramine; and
 (3) organic nitrogen compounds having a direct N—N bond, including cyclic organic nitrogen compounds; and (b) continuously removing from said reaction vessel an intermediate product consisting essentially of silicon, hydrogen, nitrogen, and carbon.

30. A process for producing, at a low temperature, a high purity mixture of silicon carbide and silicon nitride which comprises:

(a) reacting together, at a temperature, equivalent at atmospheric pressure, of from about 0° C. up to about 300° C., a particulate elemental silicon having a particle size range of from about 0.01 to 150 microns and a purity of at least about 99.5 wt.% and a reactive amine reactant in a liquid state to form an intermediate reaction product; and (b) heating said intermediate reaction product to a temperature of from about 1200-1700° C. in a nonreactive atmosphere to convert said intermediate reaction product to a crystalline material consisting essentially of a mixture of silicon carbide and silicon nitride.

* * * * *